(12) United States Patent
Webb

(10) Patent No.: US 6,847,408 B1
(45) Date of Patent: Jan. 25, 2005

(54) METHOD AND APPARATUS FOR REDUCING NOISE IN AN IMAGE SEQUENCE

(76) Inventor: Richard W. Webb, 60 Roberts Rd., Apt. 22, Los Gatos, CA (US) 95032

( * ) Notice: Subject to any disclaimer, the term of this patent is extended or adjusted under 35 U.S.C. 154(b) by 897 days.

(21) Appl. No.: 09/626,655

(22) Filed: Jul. 27, 2000

(51) Int. Cl.$^7$ ............................ H04N 5/21; H04N 5/213
(52) U.S. Cl. ........................ 348/607; 348/624; 348/620; 348/621
(58) Field of Search ................................. 348/607, 624, 348/616, 620, 621, 617, 700, 701; 382/260, 265, 275, 261, 264, 263, 266; H04N 5/21, 5/213

(56) References Cited

U.S. PATENT DOCUMENTS

| | | | | |
|---|---|---|---|---|
| 5,099,329 A | * | 3/1992 | Oyama et al. | 348/607 |
| 5,617,149 A | * | 4/1997 | Lee et al. | 348/700 |
| 5,903,680 A | * | 5/1999 | De Haan et al. | 382/265 |
| 6,281,942 B1 | * | 8/2001 | Wang | 348/607 |
| 6,535,254 B1 | * | 3/2003 | Olsson et al. | 348/607 |

* cited by examiner

Primary Examiner—Sherrie Hsia
(74) Attorney, Agent, or Firm—Vedder, Price, Kaufman & Kammholz, P.C.

(57) ABSTRACT

A method and apparatus for reducing noise in an image sequence is provided. Images in the image sequence are recursively filtered on an area-by-area or, for example, pixel-by-pixel, basis. A pixel from an image is compared to a similarly located pixel from a previous image. A difference between one or more parameters of the pixels is determined. One or, preferably, two thresholds are used to classify three types of differences. Depending on the classification, the two pixels are blended together according to their parameters in varying amounts. Relatively small differences indicate a large fraction of the previous pixel to be combined with a small fraction of the current pixel. This substantially reduces the effects of random noise, which tends to cause relatively small, transient variations in the pixels of each image of the image sequence. Relatively large differences indicate the use of 100% of the current pixel without combining any of the previous pixel. Intermediate differences indicate smoothly transitioning from combining a large fraction of the previous pixel to combining none of the previous pixel depending on the differences relative to the thresholds.

46 Claims, 5 Drawing Sheets

METHOD AND APPARATUS FOR REDUCING NOISE IN AN IMAGE SEQUENCE

TECHNICAL FIELD OF THE INVENTION

The invention relates generally to image processing and, more specifically, to noise reduction for an image sequence.

BACKGROUND OF THE INVENTION

It is common for images to appear as a sequence of images, for example, as video or motion pictures. The display of the sequence of images in rapid succession may be used to give the impression of continuous fluid motion. However, as with the processing of any signal, the processing of signals representing image sequences generally introduces noise into the image sequences. Such processing may include recording, storing, manipulating, transmitting, and displaying of the image sequences. For example, noise may result from weak television signals, a poor cable television connection, aging and handling of motion picture film, or during playback of a videocassette tape in a videocassette recorder. Thus, as more processing is performed on an image sequence, the noise introduced into the image sequence accumulates. Consequently, the image sequence displayed is not a "perfect copy" of the original image sequence, but is progressively degraded as the image sequence is processed.

Thus, it is desirable to reduce the noise in the image sequence. Moreover, image sequences are typically processed at a high rate, for example 24 or 30 frames per second. Each frame constitutes a separate image may include thousands or millions of pixels. Thus, if processing of each frame or each pixel is computationally complex, the amount of processing power needed may easily become overwhelming. Thus, a technique is needed which provides high quality image sequences by providing effective noise reduction, but which can be implemented using a few simple numerical operations.

DETAILED DESCRIPTION OF A PREFERRED EMBODIMENT

A method and apparatus for reducing noise in an image sequence is provided. Images in the image sequence are recursively filtered on an area-by-area or, for example, pixel-by-pixel, basis. A pixel from an image is compared to a similarly located pixel from a previous image. A difference between one or more parameters of the pixels is determined. One or, preferably, two thresholds are used to classify three types of differences. Depending on the classification, the two pixels are blended together according to their parameters in varying amounts. Relatively small differences indicate a large fraction of the previous pixel to be combined with a small fraction of the current pixel. This substantially reduces the effects of random noise, which tends to cause relatively small, transient variations in the pixels of each image of the image sequence. Relatively large differences indicate the use of 100% of the current pixel without combining any of the previous pixel. Intermediate differences indicate smoothly transitioning from combining a large fraction of the previous pixel to combining none of the previous pixel depending on the differences relative to the thresholds.

Figure 1:
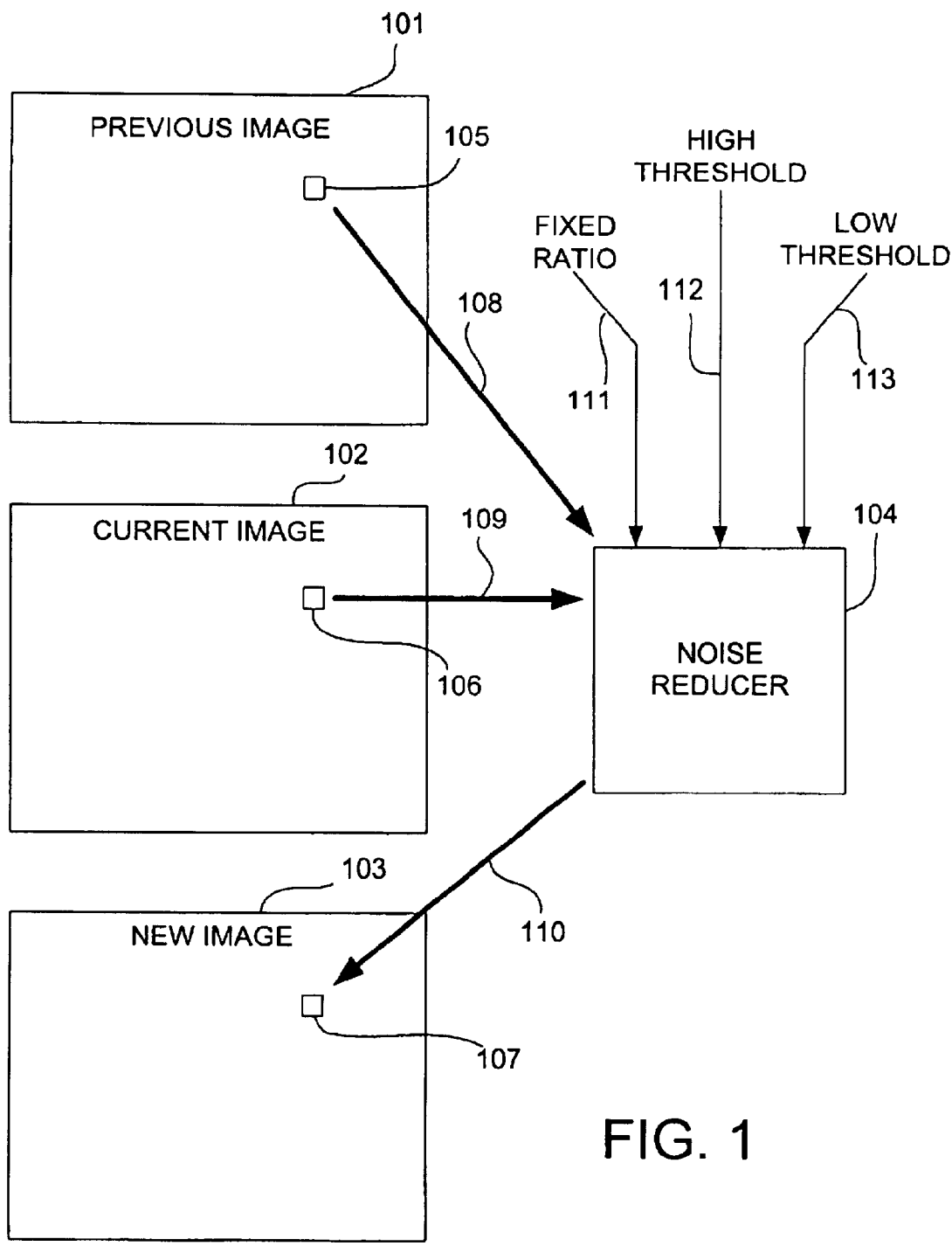
FIG. 1 is a block diagram illustrating an embodiment of the present invention.

FIG. 1 is a block diagram illustrating an embodiment of the present invention. A previous property 108 of a previous instance 105 of a pixel from previous image 101 is provided to noise reducer 104. A current property 109 of a current instance 106 of a pixel from current image 102 is provided to noise reducer 104. A fixed ratio 111, a higher threshold 112, and a lower threshold 113 are provided to noise reducer 104. Noise reducer 104 determines an absolute difference between the previous property 108 and the current property 109. Noise reducer 104 compares the absolute difference to a higher threshold 112 and a lower threshold 113. Based on the comparisons, noise reducer 104 determines a new property 110 for a new instance 107 of a pixel in a new image 103. Depending on the absolute difference, noise reducer 104 may use fixed ratio 111 in this determination. New image 103 may be used to replace current image 102, with new image 103 serving as a reduced-noise version of current image 102. Thus, new image 103 may be displayed rather than current image 102.

Moreover, to apply this embodiment of the invention to subsequent images of the image sequence, what is referred to here as the new image 103 is used as the "previous image," while the subsequent image is used as the "current image" to yield a noise-reduced version of the subsequent image. Thus, the process uses as one of its inputs a property of a pixel from an image that has already been processed using the process. Therefore, the process serves as a recursive filter, or infinite impulse response (IIR) filter, to filter noise from the image sequence.

Figure 2:
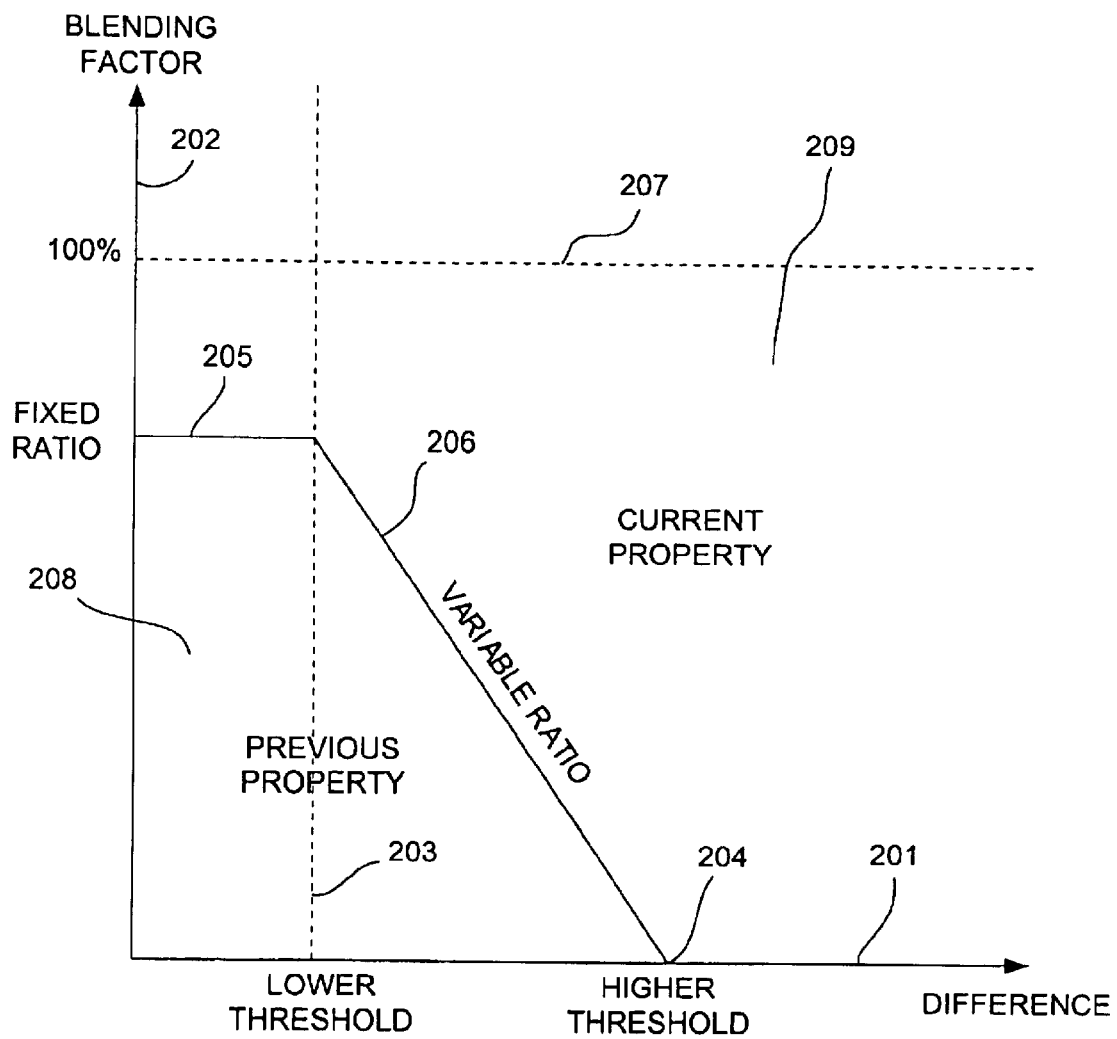
FIG. 2 is a diagram illustrating a blending factor 202 as a function of difference 201 in accordance with an embodiment of the present invention.

FIG. 2 is a diagram illustrating a blending factor 202 as a function of difference 201 in accordance with an embodiment of the present invention. Line 207 represents 100% of the value of then new property calculated by the noise reducer. The new property is determined as a combination of previous property 208 and current property 209 based on a blending factor 202 as a function of a difference 201. If the difference 201 is less than a lower threshold 203, fixed ratio 205 applies. With fixed ratio 205, the portion of previous property 208 below fixed ratio 205 is added to the portion of current property 209 above fixed ratio 205 to determine the new property. If the difference 201 is greater than lower threshold 205 but less than higher threshold 204, a variable ratio 206 is applied. Variable ratio 206 linearly decreases between lower threshold 203 and higher threshold 204. At higher threshold 204, variable ratio 206 reaches a zero percent blending factor, where none of previous property 208 is used to determine the new property. If the difference 201 is above higher threshold 204, the new property is entirely dependent on current property 209 and is independent of previous property 208.

Thus, if the difference between the previous instance of a pixel and the current instance of a pixel is small (i.e., less than lower threshold 203), previous property 208 is used to determine a large percentage of the new property, while the current property 209 is used to determine only a small percentage of the new property. Thus any slight variations in the current property that result from noise have much less influence over the new property, thereby reducing noise. If the difference between the previous property and the current property is large (i.e., greater than higher threshold 204), current property 209 is used to determine the new property. Thus, for large changes, which may represent completely different information, for example a scene change of a video image, current property 209 is used since previous property 208 may be obsolete and complete independent of current property 209. By basing the new property on current property 209 when large difference occur, residual information that is no longer relevant to the pixel is eliminated and the new property accurately reflects the new state of the pixel.

In the region between lower threshold 203 and higher threshold 204, it is more difficult to distinguish between the influence of noise on the pixel and the influence of other events, such as a scene change or a change in an object represented by the pixel. Thus, variable ratio 206 is used to adjust the amount of previous property 208 blended with current property 209 to determine the new property. The linear transition of variable ratio 206 from fixed ratio 205 to a zero blending factor helps smoothly accommodate application of the invention from pixels which may have been influenced by noise to pixels which have been changed intentionally.

Figure 3:
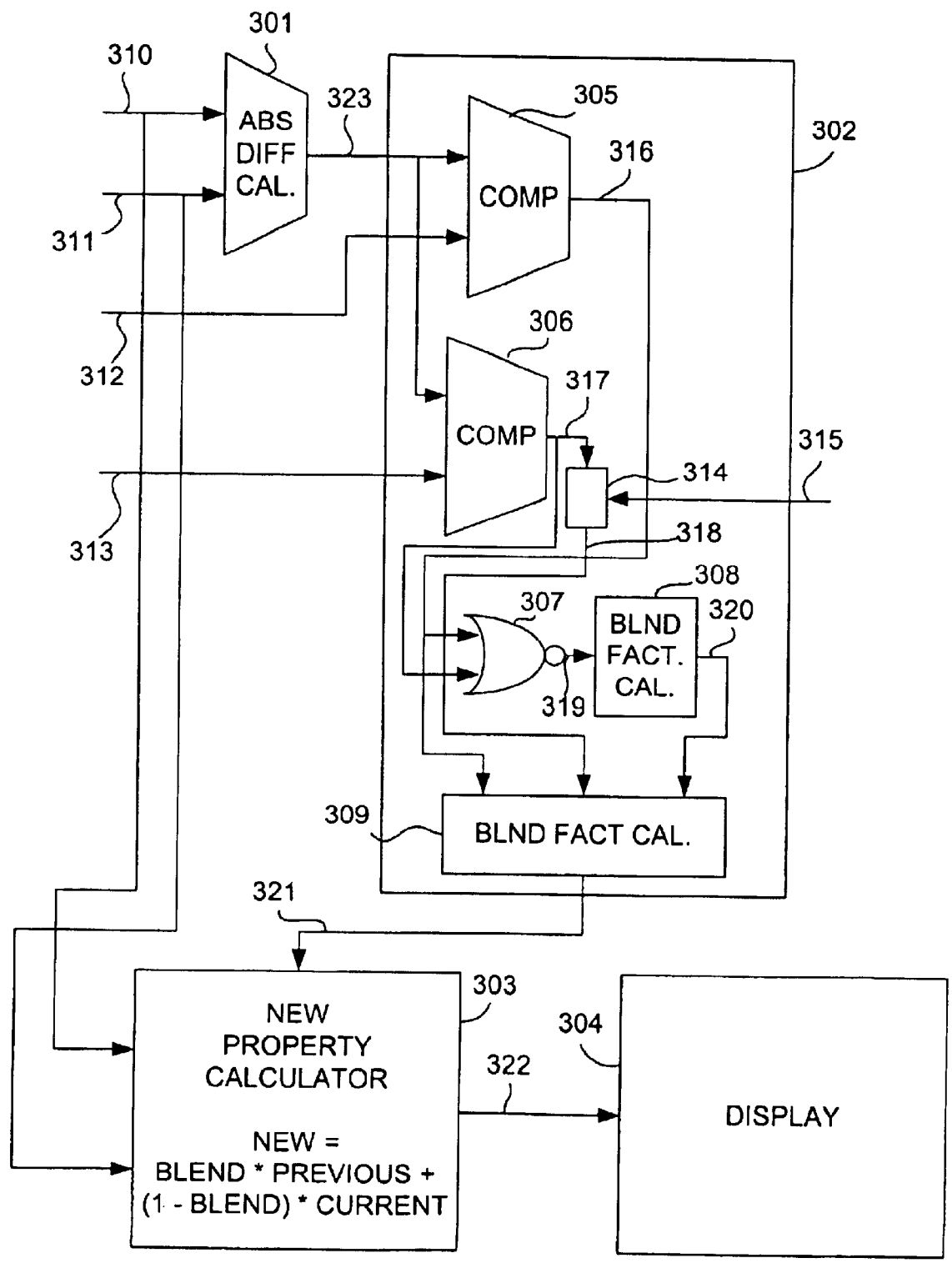
FIG. 3 is a block diagram illustrating an apparatus in accordance with an embodiment of the present invention.

FIG. 3 is a block diagram illustrating an apparatus in accordance with an embodiment of the present invention. A previous property 310 is provided to an absolute difference calculator 301 and a new property calculator 303. A current property 311 is provided to the absolute difference calculator 301 and the new property calculator 303. The absolute difference calculator 301 determines an absolute difference 323 (i.e., the absolute value of the difference) of the previous property 310 and the current property 311. The absolute difference calculator 301 provides absolute difference 323 to higher threshold comparator 305 and to lower threshold comparator 306. A higher threshold 312 is provided to higher threshold comparator 305. A lower threshold 313 is provided to lower threshold comparator 306. An output 316 of higher threshold comparator 305 is provided to an input of NOR gate 307 and blending factor selector 309. The output 316 indicates whether the absolute difference 323 is less than or greater than the higher threshold 312.

Lower threshold comparator 306 compares absolute difference 323 and lower threshold 313. Lower threshold comparator 306 provides an output 317 that indicates whether absolute difference 323 is less than or greater than lower threshold 313. Output 317 is provided to fixed ratio block 314. Fixed ratio 315 is provided to fixed ratio block 314. Output 318 of fixed ratio block 314 is provided to blending factor selector 309. Output 317 of lower threshold comparator 306 is also provided to an input of NOR gate 307. An output 319 of NOR gate 307 is applied to blending factor calculator 308. Blending factor calculator 308 calculates a blending factor when absolute difference 323 lies between lower threshold 313 and higher threshold 312. Output 320 of blending factor calculator 308 is provided to blending factor selector 309. Blending factor selector 309 selects the appropriate blending factor and provides an output 321 to new property calculator 303. New property calculator 303 uses the blending factor, in conjunction with the previous property 310 and the current property 311, to determine a new property 322. New property calculator provides new property 322 to be used by display 304 to display a pixel representing the new property 322. The new property 322 may be stored to allow its use as previous property 310 in a subsequent iteration for a subsequent pixel.

Figure 4:
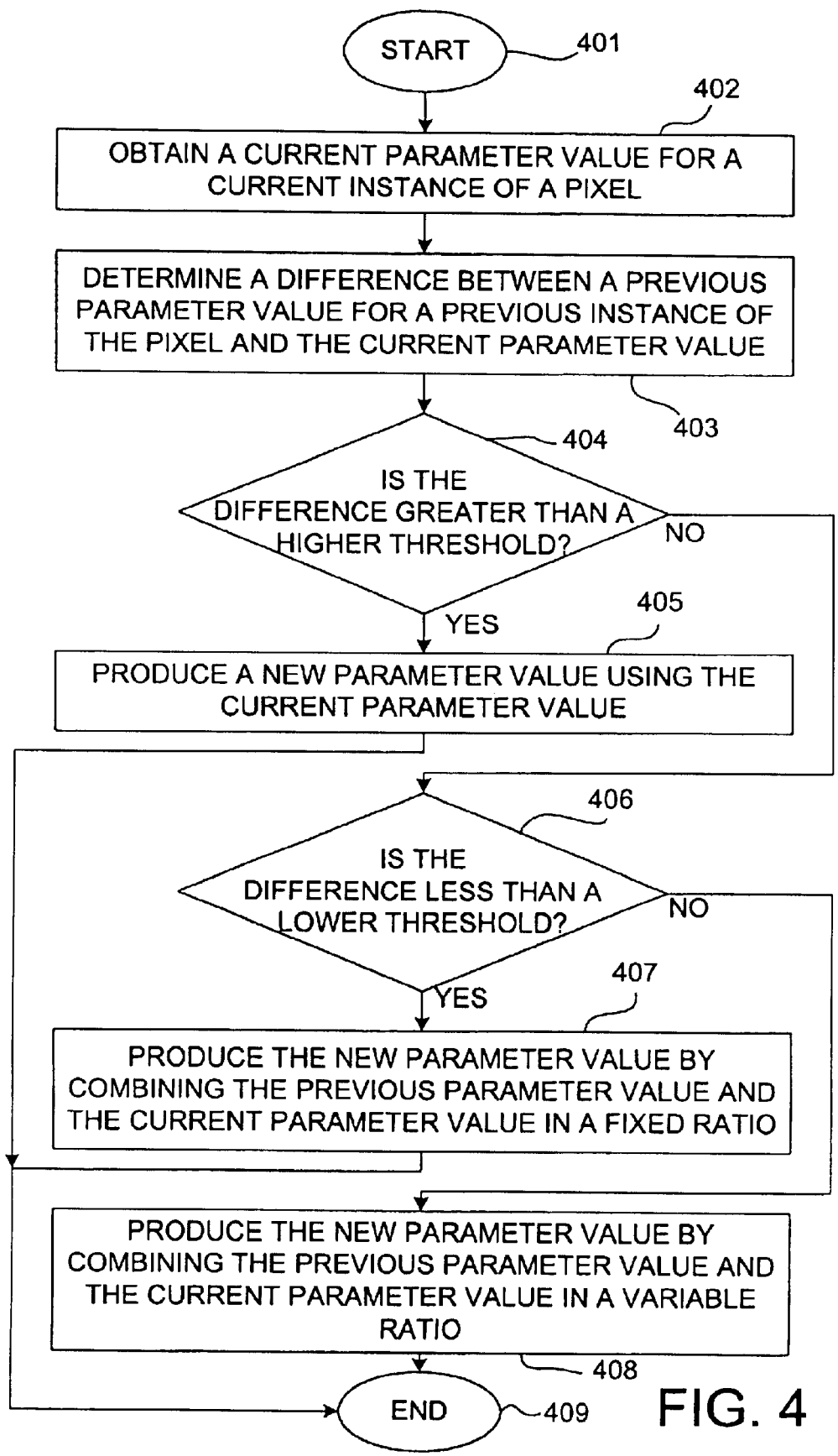
FIG. 4 is a flow diagram illustrating a method in accordance with an embodiment of the present invention.

FIG. 4 is a flow diagram illustrating a method in accordance with an embodiment of the present invention. The method begins in step 401 and continues to step 402. In step 402, a current property for a current instance of a pixel is obtained. From step 402, the process continues to step 403. In step 403, a difference between a previous property for a previous instance of the pixel and the current property is determined. From step 403, the process continues in step 404. In step 404, a determination is made as to whether or not the difference is greater than a higher threshold. If the difference is greater than the higher threshold, the process continues in step 405. In step 405, a new property is produced using the current property. This occurs independent of the previous property. From step 405, the process continues to step 409, where it ends.

If, in step 404, it is determined that the difference is not greater than the threshold, the process continues to step 406. In step 406, a determination is made as to whether the difference is less than a lower threshold. If the difference is less than a lower threshold, the process continues to step 407. In step 407, the new property is determined by combining the previous property and the current property in a fixed ratio. The fixed ratio is expressed as a previous-property-to-current-property-ratio. In one embodiment of the invention, the fixed ratio is preferably greater than 1:1. The invention may be practiced, for example, with the fixed ratio greater than 2:3, between 13:7 and 19:1, between 7:3 and 9:1, or between 3:1 and 17:3. From step 407 the process continues to step 409, where it ends.

If in step 406, the determination is made that the difference is greater than the lower threshold, the process continues to step 408. In step 408, the new property is determined by combining the previous property and the current property in a variable ratio, with the variable ratio depending on the difference. The variable ratio is more heavily weighted toward the current property than is the fixed ratio. The variable ratio exhibits an inverse linear relationship with the absolute difference between the lower threshold and the higher threshold. From step 408, the process continues to step 409, where it ends.

The properties processed according to the method may be one or more individual pixel parameters, an aggregation of pixel parameters, or a value that characterizes a pixel as a whole. Examples of pixel parameters that may be processed include a red parameter, a green parameter, a blue parameter, a cyan parameter, a magenta parameter, a yellow parameter, a chrominance parameter, a luminance parameter, a transparency parameter, a texture parameter, a grayscale parameter, an opacity parameter, a color parameter, a fog parameter, a lighting parameter, a layer parameter, and a depth parameter. Any other identifiable properties of a pixel may be processed according to the invention. For example, a bit pattern representative of the pixel or some property thereof may be processed according to an embodiment of the invention.

Moreover, the invention may be practiced using only the lower threshold or only the higher threshold instead of using both thresholds. Alternatively, additional thresholds beyond the lower threshold and the higher threshold may be introduced. For example, a third threshold may be introduced between the lower threshold and the higher threshold. Different variable ratios may be applied on each side of the third threshold. Also, the variable ratio or ratios need not be linear. Rather, a non-linear transition may be provided between the lower threshold and the higher threshold. For example, a variable ratio may be configured to provide a non-linear curve between the lower threshold and the higher threshold.

Examples of such non-linear curves include exponential and logrithmic curves.

A variety of values may be used for the fixed ratio. These ratio values may also be expressed as blending factors, where the blending factor indicates the percentage of the new property based on the previous property. For example, if the previous property has three times the influence of the current property on the new property, the ratio would be expressed as 3:1 and the blending factor would be expressed as 75%. Examples of the fixed ratio include a fixed ratio greater than 1:1 (a blending factor greater than 50%), a fixed ratio greater than 2:3 (a blending factor greater than 40%), a fixed ratio between 13:7 and 19:1 (a blending factor between 65% and 95%), a fixed ratio between 7:3 and 9:1 (a blending factor between 70% and 90%), and a fixed ratio between 3:1 and 17:3 (a blending factor between 75% and 85%).

Likewise, a variable ratio may span various ranges of values. For example, for example, the variable ratio may be included in a range from 0:1 (a blending factor of 0%) to the fixed ratio. The variable ratio may exhibit an inverse linear relationship with the absolute difference. Since the variable ratio is applicable between the lower threshold and the higher threshold, the inverse linear relationship is observed between these thresholds. According to the inverse linear relationship, the variable ratio decreases linearly as the absolute difference increases between the lower threshold and the higher threshold.

Figure 5:
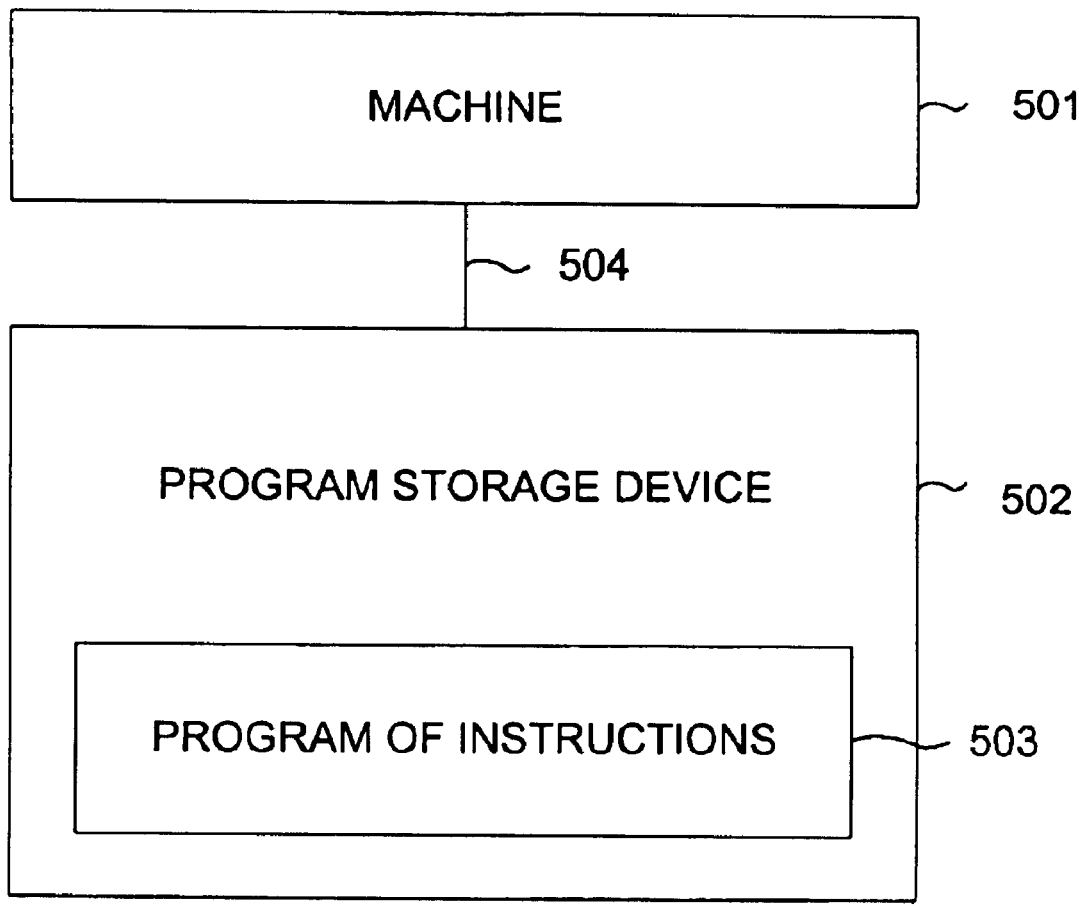
FIG. 5 is a block diagram illustrating a program storage device and a machine in accordance with an embodiment of the invention.

FIG. 5 is a block diagram illustrating a program storage device and a machine in accordance with an embodiment of the invention. Machine 501 is coupled to program storage device 502 via coupling 504. Program storage device 502 includes a program of instructions 503. The program storage device 502 is readable by the machine 501. The program storage device 502 tangibly embodies the program of instructions 503 executable by the machine 501 to perform a method of motion estimation for encoding sequential frames. The method may includes the steps recited with reference to FIG. 4. The machine 501 may be a general purpose computer system or a component thereof. Alternatively, the machine 501 may be specifically dedicated to performing the method steps described above.

One advantageous aspect of the invention is that is does not require steps to be taken before noise is introduced into the image sequence. Rather, the invention may be applied to image sequences into which noise has already been introduced. Thus, the invention is broadly applicable to image sequences affected by noise.

Accordingly, a method and apparatus for reducing noise in an image sequence has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for reducing noise in an image sequence comprising the steps of:
   obtaining a current parameter value for a current instance of a pixel;
   determining a difference between a previous parameter value for a previous instance of the pixel and the current parameter value;
   when the difference is greater than a threshold, producing a new parameter value using the current parameter value; and
   when the difference is less than the threshold, producing the new parameter value by combining the previous parameter value and the current parameter value in a variable ratio, the variable ratio depending on the difference.

2. The method of claim 1 wherein the step of producing the new parameter value using the current parameter value occurs independent of the previous parameter value.

3. The method of claim 1 wherein the step of determining the difference between the previous parameter value for the previous instance of the pixel and the current parameter value is performed for a plurality of pixel parameters.

4. The method of claim 3 wherein the plurality of pixel parameters are selected from a group consisting of:
   a red parameter;
   a green parameter;
   a blue parameter;
   a cyan parameter;
   a magenta parameter;
   a yellow parameter;
   a chrominance parameter;
   a luminance parameter;
   a transparency parameter;
   a texture parameter;
   a grayscale parameter;
   an opacity parameter;
   a color parameter;
   a fog parameter;
   a lighting parameter;
   a layer parameter; and
   a depth parameter.

5. The method of claim 1 wherein the step of determining the difference between the previous parameter value for the previous instance of the pixel and the current parameter value is performed for the pixel as a whole.

6. A method for reducing noise in an image sequence comprising the steps of:
   obtaining a current parameter value for a current instance of a pixel;
   determining a difference between a previous parameter value for a previous instance of the pixel and the current parameter value;
   when the difference is less than a lower threshold, producing a new parameter value for the current instance of the pixel by combining the previous parameter value and the current parameter value in a fixed ratio;
   when the difference is greater than a higher threshold, producing the new parameter value using the current parameter value; and
   when the difference is between the lower threshold and the higher threshold, producing the new parameter value by combining the previous parameter value and the current parameter value in a variable ratio, the variable ratio depending on the difference.

7. The method of claim 6 wherein the step of producing the new parameter value using the current parameter value occurs independent of the previous parameter value.

8. The method of claim 6 wherein the variable ratio changes linearly as a function of difference.

9. The method of claim 8 wherein the variable ratio is expressed as a previous-parameter-value-to-current-parameter-value ratio between 0:1 and the fixed ratio.

10. The method of claim 9 wherein the fixed ratio is greater than 1:1.

11. The method of claim 9 wherein the fixed ratio is greater than 2:3.

12. The method of claim 9 wherein the fixed ratio is between 13:7 and 19:1.

13. The method of claim 9 wherein the fixed ratio is between 7:3 and 9:1.

14. The method of claim 9 wherein the fixed ratio is between 3:1 and 17:3.

15. A method for reducing noise in an image sequence comprising the steps of:
  obtaining a current parameter value for a current instance of a pixel;
  determining a difference between a previous parameter value for a previous instance of the pixel and the current parameter value;
  when the difference is less than a lower threshold, producing a new parameter value for the current instance of the pixel by combining the previous parameter value and the current parameter value in a first ratio;
  when the difference is greater than a higher threshold, producing the new parameter value using the current parameter value; and
  when the difference is between the lower threshold and the higher threshold, producing the new parameter value by combining the previous parameter value and the current parameter value in a second ratio, the second ratio being more heavily weighted toward the current parameter value than the first ratio.

16. The method of claim 15 wherein the second ratio incorporates more of the current parameter value relative to the previous parameter value than is incorporated by the first ratio.

17. A method for reducing noise in an image sequence comprising the steps of:
  obtaining a current property for a current instance of a pixel;
  determining a difference between a previous property for a previous instance of the pixel and the current property;
  when the difference is less than a threshold, producing a new property for the current instance of the pixel by combining the previous property and the current property in a fixed ratio;
  when the difference is greater than the threshold, producing the new property by combining the previous property and the current property in a variable ratio, the variable ratio depending on the difference.

18. The method of claim 17 wherein the current property is a current parameter value for the current instance of the pixel, the previous property is a previous parameter value for the previous instance of the pixel, and the new property is a new parameter value.

19. The method of claim 17 wherein the current property collectively includes a plurality of current parameter values for the current instance of the pixel, the previous property collectively includes a plurality of previous parameter values for the previous instance of the pixel, and the new property includes a plurality of new parameter values.

20. Apparatus for reducing noise in an image sequence comprising:
  an absolute difference calculator operatively coupled to receive a current property of a current instance of a pixel and a previous property of a previous instance of a pixel and to provide an absolute difference of the current property and the previous property;
  a blending factor determination block operatively coupled to the absolute difference calculator to receive the absolute difference and to provide a blending factor;
  a new property calculator operatively coupled to the blending factor determination block to receive the blending factor, the previous property, and the current property and to provide a new property, the new property used to display the pixel in the image sequence.

21. The apparatus of claim 20 wherein the blending factor determination block further comprises:
  a higher threshold comparator operatively coupled to the absolute difference calculator to receive the absolute difference and to indicate a blending factor to cause the new property calculator to provide the new property based on the current property independent of the previous property when the absolute difference is greater than a higher threshold;
  a lower threshold comparator operatively coupled to the absolute difference calculator to receive the absolute difference and to indicate a blending factor to cause the new property calculator to provide the new property based on a fixed ratio of the previous property to the current property when the absolute difference is less than a lower threshold; and
  a blending factor calculator to indicate a blending factor to cause the new property calculator to provide the new property based on a variable ratio of the previous property to the current property when the absolute difference is between the lower threshold and the higher threshold.

22. The apparatus of claim 21 wherein the variable ratio exhibits an inverse linear relationship with the absolute difference between the lower threshold and the higher threshold.

23. The apparatus of claim 21 wherein the fixed ratio is greater than 1:1.

24. The apparatus of claim 21 wherein the fixed ratio is greater than 2:3.

25. The apparatus of claim 21 wherein the fixed ratio is between 13:7 and 19:1.

26. The apparatus of claim 21 wherein the fixed ratio is between 7:3 and 9:1.

27. The apparatus of claim 21 wherein the fixed ratio is between 3:1 and 17:3.

28. A program storage device readable by a machine, tangibly embodying a program of instructions executable by the machine to perform a method for reducing noise in an image sequence, the method comprising the steps of:
  obtaining a current parameter value for a current instance of a pixel;
  determining a difference between a previous parameter value for a previous instance of the pixel and the current parameter value;
  when the difference is greater than a threshold, producing a new parameter value using the current parameter value; and
  when the difference is less than the threshold, producing the new parameter value by combining the previous parameter value and the current parameter value in a variable ratio, the variable ratio depending on the difference.

29. The program storage device of claim 28 wherein the step of producing the new parameter value using the current parameter value occurs independent of the previous parameter value.

30. The program storage device of claim 28 wherein the step of determining the difference between the previous parameter value for the previous instance of the pixel and the current parameter value is performed for a plurality of pixel parameters.

31. The program storage device of claim 30 wherein the plurality of pixel parameters are selected from a group consisting of:
- a red parameter;
- a green parameter;
- a blue parameter;
- a cyan parameter;
- a magenta parameter;
- a yellow parameter;
- a chrominance parameter;
- a luminance parameter;
- a transparency parameter;
- a texture parameter;
- a grayscale parameter,
- an opacity parameter;
- a color parameter;
- a fog parameter;
- a lighting parameter;
- a layer parameter; and
- a depth parameter.

32. The program storage device of claim 28 wherein the step of determining the difference between the previous parameter value for the previous instance of the pixel and the current parameter value is performed for the pixel as a whole.

33. A program storage device readable by a machine, tangibly embodying a program of instructions executable by the machine to perform a method for reducing noise in an image sequence, the method comprising the steps of:
- obtaining a current parameter value for a current instance of a pixel;
- determining a difference between a previous parameter value for a previous instance of the pixel and the current parameter value;
- when the difference is less than a lower threshold, producing a new parameter value for the current instance of the pixel by combining the previous parameter value and the current parameter value in a fixed ratio;
- when the difference is greater than a higher threshold, producing the new parameter value using the current parameter value; and
- when the difference is between the lower threshold and the higher threshold, producing the new parameter value by combining the previous parameter value and the current parameter value in a variable ratio, the variable ratio depending on the difference.

34. The program storage device of claim 33 wherein the step of producing the new parameter value using the current parameter value occurs independent of the previous parameter value.

35. The program storage device of claim 33 wherein the variable ratio changes linearly as a function of difference.

36. The program storage device of claim 35 wherein the variable ratio is expressed as a previous-parameter-value-to-current-parameter-value ratio between 0:1 and the fixed ratio.

37. The program storage device of claim 36 wherein the fixed ratio is greater than 1:1.

38. The program storage device of claim 36 wherein the fixed ratio is greater than 2:3.

39. The program storage device of claim 36 wherein the fixed ratio is between 13:7 and 19:1.

40. The program storage device of claim 36 wherein the fixed ratio is between 7:3 and 9:1.

41. The program storage device of claim 36 wherein the fixed ratio is between 3:1 and 17:3.

42. A program storage device readable by a machine, tangibly embodying a program of instructions executable by the machine to perform a method for reducing noise in an image sequence, the method comprising the steps of:
- obtaining a current parameter value for a current instance of a pixel;
- determining a difference between a previous parameter value for a previous instance of the pixel and the current parameter value;
- when the difference is less than a lower threshold, producing a new parameter value for the current instance of the pixel by combining the previous parameter value and the current parameter value in a first ratio;
- when the difference is greater than a higher threshold, producing the new parameter value using the current parameter value; and
- when the difference is between the lower threshold and the higher threshold, producing the new parameter value by combining the previous parameter value and the current parameter value in a second ratio, the second ratio being more heavily weighted toward the current parameter value than the first ratio.

43. The method of claim 42 wherein the second ratio incorporates more of the current parameter value relative to the previous parameter value than is incorporated by the first ratio.

44. A program storage device for reducing noise in an image sequence comprising the steps of:
- obtaining a current property for a current instance of a pixel;
- determining a difference between a previous property for a previous instance of the pixel and the current property;
- when the difference is less than a threshold, producing a new property for the current instance of the pixel by combining the previous property and the current property in a fixed ratio;
- when the difference is greater than the threshold, producing the new property by combining the previous property and the current property in a variable ratio, the variable ratio depending on the difference.

45. The program storage device of claim 44 wherein the current property is a current parameter value for the current instance of the pixel, the previous property is a previous parameter value for the previous instance of the pixel, and the new property is a new parameter value.

46. The program storage device of claim 44 wherein the current property collectively includes a plurality of current parameter values for the current instance of the pixel, the previous property collectively includes a plurality of previous parameter values for the previous instance of the pixel, and the new property includes a plurality of new parameter values.

* * * * *